United States Patent [19]
Nomura

[11] Patent Number: 5,608,579
[45] Date of Patent: Mar. 4, 1997

[54] PROJECTION TV SET APPARATUS

[75] Inventor: Tsuneharu Nomura, Kanagawa, Japan

[73] Assignee: Sony Corporation, Tokyo, Japan

[21] Appl. No.: 407,098

[22] Filed: Mar. 20, 1995

[30] Foreign Application Priority Data

Mar. 30, 1994 [JP] Japan ................... 6-061346

[51] Int. Cl.⁶ ........................................ G02B 27/10
[52] U.S. Cl. ................................. 359/820; 359/819
[58] Field of Search ........................... 359/820, 821, 359/811, 819

[56] References Cited

U.S. PATENT DOCUMENTS

| | | | |
|---|---|---|---|
| 3,835,346 | 10/1974 | Mast | 313/394 |
| 4,609,945 | 9/1986 | Oguino | 358/237 |
| 4,929,073 | 5/1990 | LaPlante | 359/819 |
| 4,948,226 | 8/1990 | Ozaki | 359/820 |
| 5,053,794 | 10/1991 | Benz | 354/79 |
| 5,157,554 | 10/1992 | Kashihara | 359/820 |
| 5,249,082 | 9/1993 | Newman | 359/813 |
| 5,396,487 | 3/1995 | Abe | 359/819 |

Primary Examiner—Scott J. Sugarman
Assistant Examiner—Ricky Mack
Attorney, Agent, or Firm—Jay H. Maioli

[57] ABSTRACT

A projection TV set apparatus includes a lens, a mirror sleeve for holding the lens, and a buffer material provided at a connecting portion between the lens and the mirror sleeve and having a smaller modulus of elasticity than the lens. Also, a projection lens assembly for a projection TV set apparatus which is arranged in front of a light source of the projection TV set apparatus includes a mirror sleeve and at least one lens fitted inside the mirror sleeve having projections formed at at least three locations in the radial direction on the outer circumference of the lens to contact a connecting portion of the mirror sleeve.

6 Claims, 3 Drawing Sheets

PROJECTION TV SET APPARATUS

BACKGROUND OF THE INVENTION

1. Field of the Invention

The present invention relates to a projection TV set apparatus, more particularly to a projection lens assembly of a projection TV set apparatus which can prevent a reduction in focusing performance of projection lenses caused by a rise in temperature during operation.

2. Description of the Related Art

Rear projection type projection television set apparatuses have larger screens than regular television sets and enable large-sized displays. In such rear projection type projection TV set apparatuses, projection cathode-ray tubes (CRT) produce red (R), green (G), and blue (B) images which they project to a screen. The viewer sees the picture on the opposite side of the screen from the side where the images are projected.

In front of the projection CRTs, lens assemblies are provided which focus the images produced from the projection CRTs to form the picture on the screen. Each lens assembly consists of a mirror sleeve and at least one lens fitted inside the mirror sleeve. In general, there are a combination of plastic lenses and glass lenses in the mirror sleeve of the lens assembly. The mirror sleeve is typically comprised of a metal or plastic.

The coefficients of thermal expansion of plastics, metals, and glass fall into the following relationship: Ep>Em>Eg, where Ep is the coefficient of plastics, Em is the coefficient of metals, and Eg is the coefficient of glass.

The projection CRTs become high in temperature during operation and therefore usually are cooled at the front.

The fronts of the projection CRTs can become as high as 90° C. in temperature, however. Accordingly, the lens assemblies also become heated and problems arise as a result of the differences in the coefficients of thermal expansion of the components of the assemblies.

For example, if the mirror sleeve is made of a metal, a plastic lens will be subjected to pressure from the mirror sleeve due to its having a larger coefficient of thermal expansion than the mirror sleeve. The lens face will deform in shape and the focusing performance will therefore drop. A glass lens, further, has a smaller coefficient of thermal expansion than the mirror sleeve and therefore a gap will be caused at the fitting portion between the mirror sleeve and the glass lens. As a result, the plastic lens and glass lens will become off-centered from each other. In this case as well, the focusing performance will drop.

Note that even if the mirror sleeve is made of plastic, a similar problem will arise with the glass lens.

SUMMARY OF THE INVENTION

An object of the present invention is to provide a projection lens assembly for a projection TV set apparatus which prevents a reduction in the focusing performance of projection lenses caused by a rise in temperature during operation.

To achieve the above object, there is provided a projection TV set apparatus comprising a lens, a mirror sleeve for holding the lens, and a buffer material provided at the fitting portion between the lens and the mirror sleeve and having a smaller modulus of elasticity than the lens.

Preferably, the thickness of the buffer material in the diametrical direction is 0.1 to 3 percent of the outer diameter of the lens.

Preferably, the buffer material is a synthetic rubber.

Further, there is provided a projection lens assembly for a projection TV set apparatus which is arranged in front of a light source of the projection TV set apparatus and is comprised of a mirror sleeve and at least one lens fitted inside the mirror sleeve, wherein projections coming into contact between the lens and the fitting portion with the mirror sleeve are formed at least at three locations in the radial direction on the outer circumference of the lens.

Preferably, the height of the projections is not more than 2 percent of the outer diameter of the lens.

As the light source, use may be made of a projection CRT or a backlighted liquid crystal display panel.

In the lens assembly of the projection TV set apparatus of the present invention, since a buffer material with a modulus of elasticity sufficiently smaller than the lenses is attached at the fitting portions between the lenses and the mirror sleeve, even if the lens assembly reaches a high temperature during of operation of the projection TV set apparatus, the gap at the fitting portions and the stress acting on the lenses due to the difference in thermal expansion of the components (mirror sleeve and lenses) can be absorbed by the buffer material.

Specifically, when the mirror sleeve is metal, and plastic and glass lenses are fitted inside the mirror sleeve, the elastic deformation of the buffer material prevents the deformation of the plastic lenses due to thermal expansion.

Further, by attaching the glass lens to the fitting portion between the lens and the mirror sleeve while sufficiently elastically deforming the buffer material, it is possible to prevent gaps between the glass lens and mirror sleeve even with differences in thermal expansion and the lenses will therefore not become off-centered.

Accordingly, there is no reduction in the focusing performance either.

Further, in another aspect of the lens assembly of a projection TV set apparatus of the present invention, at least three projections are formed in the radial direction on the outer circumference of a lens. The lens in this case is preferably a plastic lens. However, formation of projections on the outer circumference of the glass lens also falls within the scope of the present invention. Further, the projections do not have to be formed integrally with the lens. Projections may be provided on the outer circumference of the lens any means.

If projections are formed at the outer circumference of the plastic lens, if the mirror sleeve is made of a metal, then the difference in thermal expansion during operation will cause the mirror sleeve to press against the outer circumference of the plastic lens, but that force will concentrate at the projection portions, so there will be no deformation of the plastic lens itself.

Further, when the mirror sleeve is comprised of a material with a coefficient of thermal expansion larger than the lens on whose outer circumference the projections are formed, by attaching the lens to the fitting portion between the lens and the mirror sleeve while forcibly deforming the projections, it is possible to prevent gaps at the fitting portion caused by differences in thermal expansion during operation. As a result, the lens does not become off-centered.

Accordingly, there is no reduction in focusing performance either.

Note that even if the projections deform, there is no problem in the function of the lenses since the lens itself does not deform much at all.

BRIEF DESCRIPTION OF THE DRAWINGS

The above objects and features of the present invention will be more apparent from the following description of the preferred embodiments with reference to the accompanying drawings, wherein.

DESCRIPTION OF THE PREFERRED EMBODIMENTS

Figure 1:
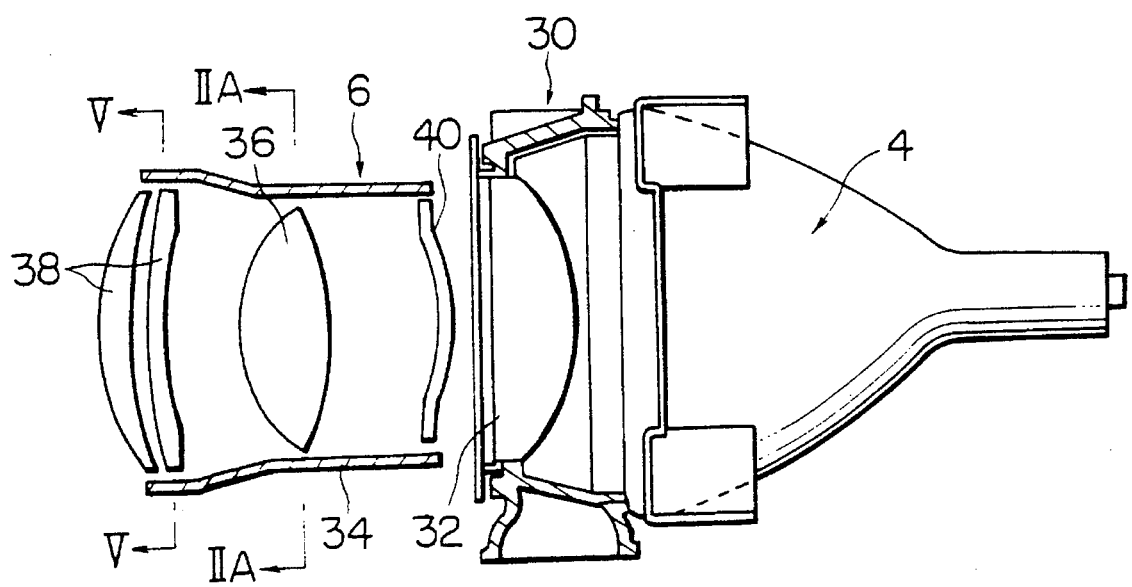
FIG. 1 is a cross-sectional view of key portions of a projection lens assembly of a projection TV set apparatus according to a first embodiment of the present invention.

The projection lens assembly of a projection TV set apparatus according to the present invention will be explained in detail below with reference to embodiments shown in the drawings.

Figures 2A, 2B:
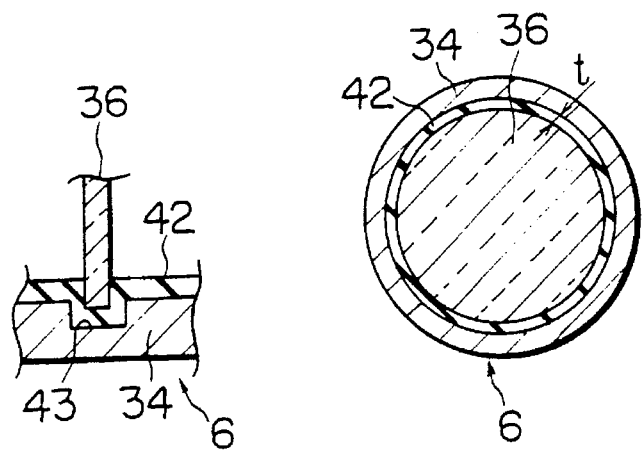
FIG. 2A is a cross-sectional view along line IIA—IIA in FIG. 1.
FIG. 2B is a cross-sectional view of key portions of the fitting portion between the lens and mirror sleeve.
Figure 3A:
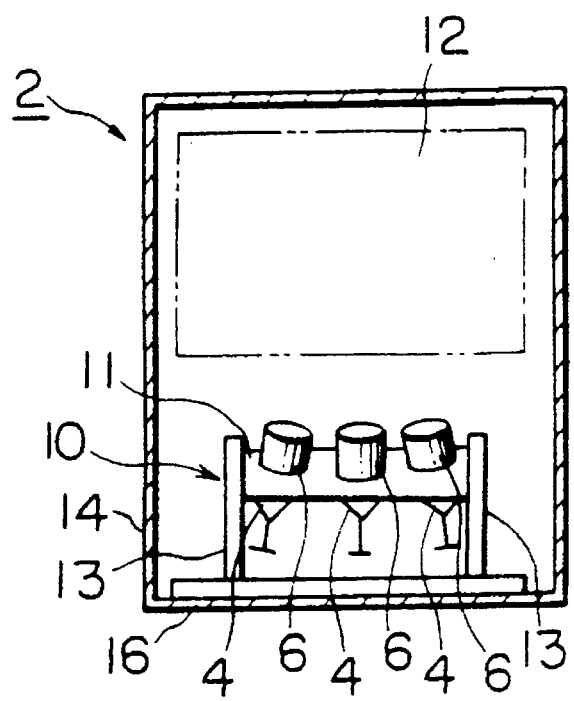
FIG. 3A is a schematic cross-sectional view of the front of a projection TV set apparatus.
Figure 3B:
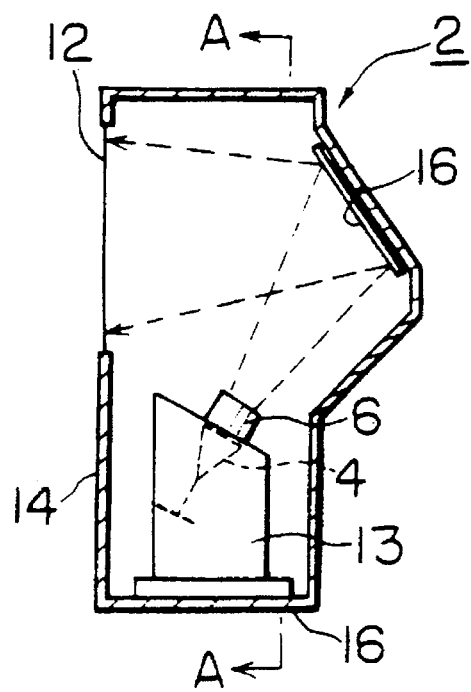
FIG. 3B is a schematic cross-sectional view of the side of a projection TV set apparatus.
Figure 4:
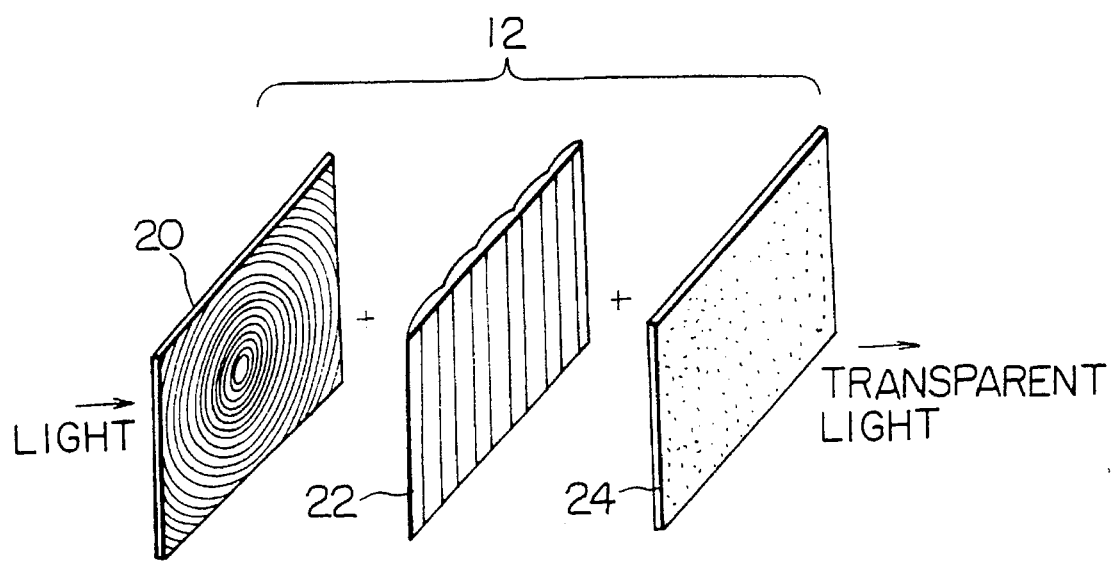
FIG. 4 is a broken down perspective view of the screen shown in FIG. 3.
Figure 5:
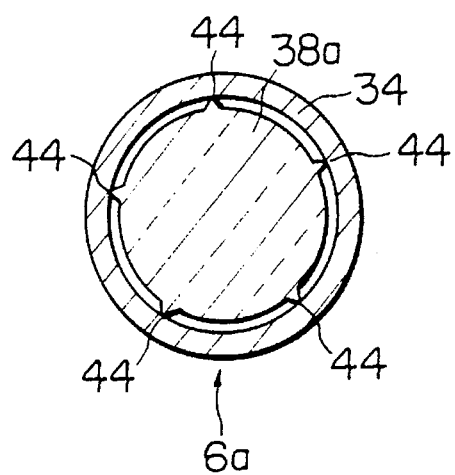
FIG. 5 is a cross-sectional view of key portions of a projection lens assembly of a protection TV set apparatus according to a second embodiment of the present invention.

FIG. 1 is a cross-sectional view of key portions of a projection lens assembly of a projection TV set apparatus according to a first embodiment of the present invention; FIG. 2A is a cross-sectional view along line IIA—IIA in FIG. 1; FIG. 2B is a cross-sectional view of key portions of the fitting portion between the lens and mirror sleeve; FIG. 3A is a schematic cross-sectional view of the front of a projection TV set apparatus; FIG. 3B is a schematic cross-sectional view of the side of a projection TV set apparatus; FIG. 4 is a broken down perspective view of the screen shown in FIG. 3; and FIG. 5 is a cross-sectional view of key portions of a projection lens assembly of a protection TV set apparatus according to a second embodiment of the present invention.

First, an explanation will be made of the overall configuration of a projection TV set apparatus according to an embodiment of the present invention based on FIGS. 3A and 3B and FIG. 4.

In the projection TV set apparatus shown in FIGS. 3A and 3B, three projection CRTs 4, 4, and 4 for producing red (R), green (G), and blue (B) images are attached to a chassis 10 along with lens assemblies 6, 6, and 6 disposed in front of each of the same. The chassis 10 is provided with a first chassis member 11 to which the CRTs 4, 4, and are directly attached and a pair of second chassis members 13 which support the two ends of the first chassis member 11. The second chassis members 13 are set on top of a support 16 of a casing 14.

A large-sized screen 12 is mounted at the top front of the casing 14. Inside the casing 14 is attached a reflection mirror 16 for reflecting the images produced from the CRTs 4, 4, and 4 and forming a picture on the rear of the screen.

The screen 12, as shown in FIG. 4, is comprised of a plurality of screens, that is, a Fresnel screen 20, a lenticular screen 22, and a contrast screen 24. The Fresnel screen 20 collects the light from the CRTs. The lenticular screen 22 divides the light collected by the Fresnel screen 20 to the left and right. The lenticular screen 22 is preferably provided with black stripes for the purposes of improving the contrast etc.

Next, an explanation will be made of the projection CRTs 4 and lens assemblies 6 of the embodiment.

As shown in FIG. 1, a coupler 30 is attached at the front of the projection CRT 4. The coupler 30 is provided with a meniscus lens 32. The meniscus lens 32 is comprised for example of a plastic lens and serves mainly to correct image distortion. It is assembled together with the group of lenses of the lens assembly 6 to achieve desired optical characteristics. Between the meniscus lens 32 and the front of the CRT 4, a cooling medium is preferably filled so as to cool the CRT.

The lens assembly 6, as shown in FIG. 1, is provided with a mirror sleeve 34 made of a metal, for example, and a plurality of lenses 36, 38, and 40 disposed in the mirror sleeve 34 at predetermined intervals in the axial direction. The lens 36 positioned at the center is a spherical lens for convergence and is generally comprised of a glass lens.

The lens 40 disposed at the CRT side of the mirror sleeve 34 is an aspherical lens for correction of aberration and generally is comprised of a plastic lens. The lens 38 positioned at the non-CRT side of the mirror sleeve 34 is an aspherical lens for correction of aberration and is generally comprised of a plastic lens.

In this embodiment, as shown in FIG. 2A, a buffer material 42 is surrounds the entire inside of the mirror sleeve 34 or at least at the fitting portion between the lenses 36, 38, and 40 and the mirror sleeve 34.

The buffer material 42, as shown in FIG. 2B, has a shape matching the shape of the depression 43 serving as the fitting portion between a lens and the mirror sleeve 34 and accordingly is shaped overall as a ring. The buffer material 42 is comprised of a material with a modulus of elasticity sufficiently smaller than the lenses 36, 38, and 40. Materials with modulii of elasticity sufficiently smaller than the lenses 36, 38, and 40 include for example styrene-butadiene rubber (SBR), butadiene rubber (BR), isoprene rubber (IR), nitrile-butadiene rubber (NBR), chloroprene rubber (CR), and other diene rubbers, butyl rubber (IIR), ethylene-propylene-diester polymer rubber (EPDM), acryl rubber, chlorosulfonated polyethylene rubber, fluororubbers, and other olefin rubbers, silicone rubber, urethane rubber, polysulfide rubber, and foams of the same or foams of urethane or nylon.

The thickness $t$ in the diametrical direction of the buffer material 42 is preferably 0.1 to 3 percent of the outer diameter of the lens in a state before attachment of the lenses 36, 38, and 40. The buffer member 42 preferably is compressed to 30 to 50 percent of the thickness t of the buffer material 42 in the diametrical direction after attachment of the lenses 36, 38, and 40.

In the lens assembly 6 of the projection TV set apparatus of this embodiment, since the buffer material 42 with a modulus of elasticity sufficiently smaller than the lenses is attached to the fitting portion between the lenses 36, 38, and 40 and the mirror sleeve 34, even if the lens assembly 6 reaches the a high temperature of room temperature plus 25° to 50° C. during operation of the projection TV set apparatus, the gap at the fitting portion and the stress acting on the lenses due to the difference in thermal expansion of the components (mirror sleeve 34 and lenses 36, 38, and 40) can be absorbed by the buffer material 42.

Specifically, when the mirror sleeve 34 is metal, the thermal expansion of the plastic lenses 38 and 40 can be absorbed by the elastic deformation of the buffer material and thereby deformation of the plastic lenses 38 and 40 can be prevented.

Further, by attaching the glass lens 36 to the fitting portion between the lens and the mirror sleeve 34 while sufficiently elastically deforming the buffer material 42, it is possible to prevent gaps between the glass lens 36 and mirror sleeve 34 even with differences in thermal expansion and therefore the glass lens 36 does not become off-centered with respect to the plastic lenses 38 and 40.

Accordingly, there is no reduction in the focusing performance either.

Next, an explanation will be made of a second embodiment of the present invention.

In this embodiment, as shown in FIG. 5, at least three projections 44 (in the embodiment, five) are formed in the radial direction on the outer circumference of the plastic lens 38a to be fit into the mirror sleeve 34. At least three projections 44 are stipulated so as to enable the lens 38a to be stably attached within the mirror sleeve 34. Note that if there are too many projections 44, the effect of the projections in the embodiment diminishes, so the upper limit of the number of projections 44 is 10 to 20. The number of projections 44 is preferably 4 to 10.

The height of the projections 44 is determined in accordance with the outer diameter of the lens 38a etc. and is designed so that at least the tips of the projections 44 contact the inside of the fitting portion between the lens and the mirror sleeve 34. The height of the projections 44 is preferably not more than 2 percent of the outer diameter of the lens, more preferably in the range of 0.1 to 1 percent of the outer diameter of the lens.

In the lens assembly 6a of this embodiment, when the projections 44 are formed at the outer circumference of the lens 38a, if the mirror sleeve 34 is made of a metal, then the difference in thermal expansion during operation will cause the mirror sleeve 34 to press against the outer circumference of the plastic lens 38a, but that force will concentrate at the projections, so there will be no deformation of the plastic lens 38a itself.

Further, when the mirror sleeve 34 is comprised of a material with a coefficient of thermal expansion larger than the lens on whose outer circumference the projections 44 are formed, by attaching the lens to the fitting portion between the lens and the mirror sleeve 34 while forcibly deforming the projections 44, it is possible to prevent gaps at the fitting portion caused by differences in thermal expansion during operation. As a result, the lens does not become off-centered.

Accordingly, there is no reduction in the focusing performance either.

Note that even if the projections 44 deform, there is no problem in the function of the lens since the lens itself does not deform much at all.

while the invention has been described by reference to the specific embodiments chosen for purposes of illustration, it should be apparent that numerous modifications could be made thereto by those skilled in the art without departing from the basic concept and scope of the invention.

For example, the projection light source in front of which the lens assembly is arranged is not limited to a CRT. Use may also be made of a backlighted liquid crystal display panel. However, the action and effect of the invention are particularly great when the lens assembly adopting the configuration of the present invention is used for a projection CRT in which heat causes a problem.

Further, the lens assembly of the present invention is not limited to one for a rear projection type projection TV set apparatus and can be applied as well to a front projection type projection TV set apparatus.

Further, in the above embodiments, the mirror sleeve 34 was made of a metal, but it may also be made of a plastic or other material. In these cases as well, similar action as in the above embodiments is obtained.

Still further, inside the mirror sleeve 34 of the lens assembly of the present invention, it is also possible to use a combination of glass lenses and the like attached using a buffer material and plastic lenses and the like formed with projections on their outer circumferences.

As explained above, according to the first aspect of the present invention, even if the lens assembly becomes high in temperature during operation of the projection TV set apparatus, the gaps in the fitting portion or the stress acting on the lenses caused by the difference in thermal expansion of the components (mirror sleeve and lenses) can be absorbed by the buffer material. Accordingly, it is possible to prevent deformation of the plastic lenses due to thermal expansion. Further, there are no longer gaps between the glass lens and the mirror sleeve or off-centering of the lenses due to differences in thermal expansion.

Accordingly, there is no reduction in the focusing performance.

According to the second aspect of the present invention, the mirror sleeve presses against the outer circumference of the plastic lens, but the force of that pressure concentrates at the projections portions, so the plastic lens itself does not deform.

In addition, when the mirror sleeve is made of a material with a coefficient of thermal expansion larger than the lens with the projections at the outer circumference, the lens is attached at the fitting portion of the mirror sleeve while forcibly deforming the projections, so no gap forms at the fitting portion due to the difference in thermal expansion at the time of operation. As a result, there is never any off-centering of the lens.

Accordingly, there is no reduction in the focusing performance here either.

What is claimed is:

1. A projection lens assembly for a projection TV set apparatus arranged in front of a light source of said projection TV set apparatus and comprising a mirror sleeve and at least one glass lens mounted inside said mirror sleeve, wherein projections contacting a fitting portion of said mirror sleeve are formed at least three locations in the radial direction on an outer circumference of said lens, wherein the height of said projections is in the range of 0.1 to 1 percent of the outer diameter of said lens, and wherein said mirror sleeve is comprised of material having a coefficient of thermal expansion greater than a coefficient of thermal expansion of said lens.

2. A projection lens assembly for a projection TV set apparatus arranged in front of a light source of said projection TV set apparatus and comprising a mirror sleeve and at least one glass lens mounted inside said mirror sleeve, wherein projections contacting a fitting portion of said mirror sleeve are formed at at least three locations in the radial direction on an outer circumference of said lens, wherein the number of said projections is less than 20, and wherein said mirror sleeve is comprised of material having a coefficient of thermal expansion greater than a coefficient of thermal expansion of said lens.

3. A projection lens assembly for a projection TV set apparatus arranged in front of a light source of said projection TV set apparatus and comprising a mirror sleeve and at least one glass lens mounted inside said mirror sleeve, wherein projections contacting a fitting portion of said mirror sleeve are formed at at least three locations in the radial direction on an outer circumference of said lens, wherein the number of said projections is in the range of 4 to 10, and wherein said mirror sleeve is comprised of material having a coefficient of thermal expansion greater than a coefficient of thermal expansion of said lens.

4. A projection lens assembly for a projection TV set apparatus arranged in front of a light source of said projection TV set apparatus and comprising a mirror sleeve and at least one plastic lens mounted inside said mirror sleeve, wherein projections contacting a fitting portion of said mirror sleeve are formed at at least three locations in the radial direction on an outer circumference of said lens, wherein the height of said projections is in the range of 0.1 to 1 percent of the outer diameter of said lens, and wherein said mirror sleeve is comprised of a material having a coefficient of thermal expansion greater than a coefficient of thermal expansion of said lens.

5. A projection lens assembly for a projection TV set apparatus arranged in front of a light source of said projection TV set apparatus and comprising a mirror sleeve and at least one plastic lens mounted inside said mirror sleeve, wherein projections contacting a fitting portion of said mirror sleeve are formed at at least three locations in the radial direction on an outer circumference of said lens, wherein the number of said projections is less than 20, and wherein said mirror sleeve is comprised of a material having a coefficient of thermal expansion greater than a coefficient of thermal expansion of said lens.

6. A projection lens assembly for a projection TV set apparatus arranged in front of a light source of said projection TV set apparatus and comprising a mirror sleeve and at least one plastic lens mounted inside said mirror sleeve, wherein projections contacting a fitting portion of said mirror sleeve are formed at at least three locations in the radial direction on an outer circumference of said lens, wherein the number of said projections is in the range of 4 to 10, and wherein said mirror sleeve is comprised of a material having a coefficient of thermal expansion greater than a coefficient of thermal expansion of said lens.

* * * * *